US009496080B2

(12) United States Patent
Wilson et al.

(10) Patent No.: US 9,496,080 B2
(45) Date of Patent: Nov. 15, 2016

(54) FLEXIBLE ELECTROMAGNETIC CLAMP

(71) Applicant: The Boeing Company, Chicago, IL (US)

(72) Inventors: Jake Aspen Wilson, Charleston, SC (US); Andrew Michael Huckey, Charleston, SC (US); Mark Edward Nestleroad, Charleston, SC (US); Craig Allen Charlton, Charleston, SC (US)

(73) Assignee: The Boeing Company, Chicago, IL (US)

( * ) Notice: Subject to any disclaimer, the term of this patent is extended or adjusted under 35 U.S.C. 154(b) by 13 days.

(21) Appl. No.: 14/666,724

(22) Filed: Mar. 24, 2015

(65) Prior Publication Data
US 2016/0284457 A1 Sep. 29, 2016

(51) Int. Cl.
*H01F 7/20* (2006.01)

(52) U.S. Cl.
CPC ....................... *H01F 7/20* (2013.01)

(58) Field of Classification Search
CPC .... H01F 7/0252; H01F 7/0257; H01F 7/206; H01F 2007/208; H01F 7/04; B23Q 3/1546; B23Q 3/1543; B23Q 3/154; B25B 11/002; B25H 3/04
See application file for complete search history.

(56) References Cited

U.S. PATENT DOCUMENTS

| 3,045,620 | A | 7/1962 | Buck |
| 7,148,776 | B2 | 12/2006 | Day et al. |
| 9,281,108 | B2* | 3/2016 | Sarh ..................... B25B 11/002 |
| 2010/0071192 | A1* | 3/2010 | Sarh ..................... B21J 15/14 |
| | | | 29/525.06 |

* cited by examiner

*Primary Examiner* — Bernard Rojas
(74) *Attorney, Agent, or Firm* — Duft Bornsen & Fetting LLP

(57) ABSTRACT

Embodiments described herein provide a flexible electromagnetic clamp that may be utilized to provide an adjustable clamping force to a wide variety of non-planar surfaces. One embodiment comprises an electromagnetic clamp that includes a pair of electromagnetic members and a current source. The electromagnetic members are disposed on opposing sides of an assembly to be clamped. Each electromagnetic member includes a flexible bladder that includes ferromagnetic filings, an electrical winding wrapped around the bladder, and a flexible sleeve wrapped around the electrical winding and the bladder. The electrical winding generates a magnetic field across the bladder that is based on an applied current. The current source is electrically coupled to each electrical winding and controls a clamping force applied by the electromagnetic members to the assembly based on the applied current.

19 Claims, 7 Drawing Sheets

FLEXIBLE ELECTROMAGNETIC CLAMP

FIELD

This disclosure relates to the field of manufacturing, and in particular, to securing assemblies together during manufacturing.

BACKGROUND

Clamps are often used during assembly of aircraft components when it is desirable for the components to be precisely positioned prior to performing a subsequent operation on the components. For example, during assembly of an aircraft fuselage, two sections of the fuselage are aligned with respect to each other, and clamped together along with a drilling template. The clamps are configured to generate a clamping force to counteract the drilling force applied by the drill bits, which may force the sections apart if the clamping force is insufficient. Three undersized holes are initially drilled through the pair of sections via the drilling template. The clamps and the template are then removed and a de-burr process is performed on the holes. A pair of alignment pins is inserted into the outermost openings, and the two sections are reassembled. The middle opening is drilled to its nominal size using a track drilling machine.

This process is continued repeatedly for the entire circumference of the sections in a drilling procedure generally known as leap-frogging. Leap-frogging is used because the clamps are only capable of applying the clamping force to a relatively small area. Thus, the clamps are continuously shifted from area to area along the mating surfaces of the sections of fuselage. Shifting the clamps also entails disassembling the sections, performing a de-burr process on the holes, and reassembling the sections. Leap-frogging is therefore expensive in both the number of steps that are performed and the time it takes to perform the steps.

Further, the mating sections of the fuselage are non-planar, which makes it difficult to apply the clamping force to a large area of the fuselage when assembling the sections together. Also, some sections of the fuselage may be irregularly shaped (e.g., not a simple curve), which may require custom clamping systems that are specifically designed for a particular section of the fuselage. Thus, existing clamping systems may be inadequate or inefficient, especially when used to secure irregular or non-planar assemblies together during manufacturing.

SUMMARY

Embodiments provided herein describe a flexible electromagnetic clamp that may be utilized to provide an adjustable clamping force to a wide variety of non-planar surfaces. For instance, the electromagnetic clamp may be utilized during the assembly of sections of an aircraft fuselage, which poses assembly challenges due to their non-planar mating surfaces. Due to the flexible nature of the electromagnetic clamp, the electromagnetic clamp is able to conform to a non-planar clamping surface as the clamping force is increased on the assembly. This ensures that the clamping force is applied nearly uniformly to the assembly over a large area.

One embodiment comprises an electromagnetic clamp that includes a pair of electromagnetic members and a current source. The electromagnetic members are disposed on opposing sides of an assembly to be clamped. Each electromagnetic member includes a flexible bladder having ferromagnetic filings, an electrical winding wrapped around the bladder, and a flexible sleeve wrapped around the electrical winding and the bladder. The electrical winding generates a magnetic field across the bladder that is based on an applied current. The current source is electrically coupled to each electrical winding and controls a clamping force applied by the electromagnetic members to the assembly based on the applied current.

Another embodiment comprises clamping system. The clamping system includes a first flexible electromagnetic member, a second flexible electromagnetic member, and a current source. The first electromagnetic member is disposed on a first side of an object to be clamped. The second flexible electromagnetic member that is disposed on a second side of the object to be clamped. The current source is electrically coupled to the first and second electromagnetic members and controls a clamping force exerted by the first and second electromagnetic members on the object.

Another embodiment comprises an apparatus that includes an electromagnetic clamp and at least one current source. The electromagnetic clamp includes a first flexible member that is disposed on a first side of an assembly to be clamped. The first member includes a first internal bladder that includes ferromagnetic filings and a first electrical winding. The first electrical winding generates a first magnetic field across the first member based on a first applied current. The electromagnetic clamp further includes a second flexible member that is disposed on a second side of the assembly to be clamped. The second member includes a second internal bladder that includes ferromagnetic filings and a second electrical winding. The second electrical winding generates a second magnetic field across the second member based on a second applied current, where the first magnetic field and the second magnetic field are configured in opposition. The at least one current source is electrically coupled to the first electrical winding and the second electrical winding. The at least one current source varies at least one of the first applied current and the second applied current to modify a strength of at least one of the first magnetic field and the second magnetic field to control a clamping force applied by the first member and the second member to the assembly The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
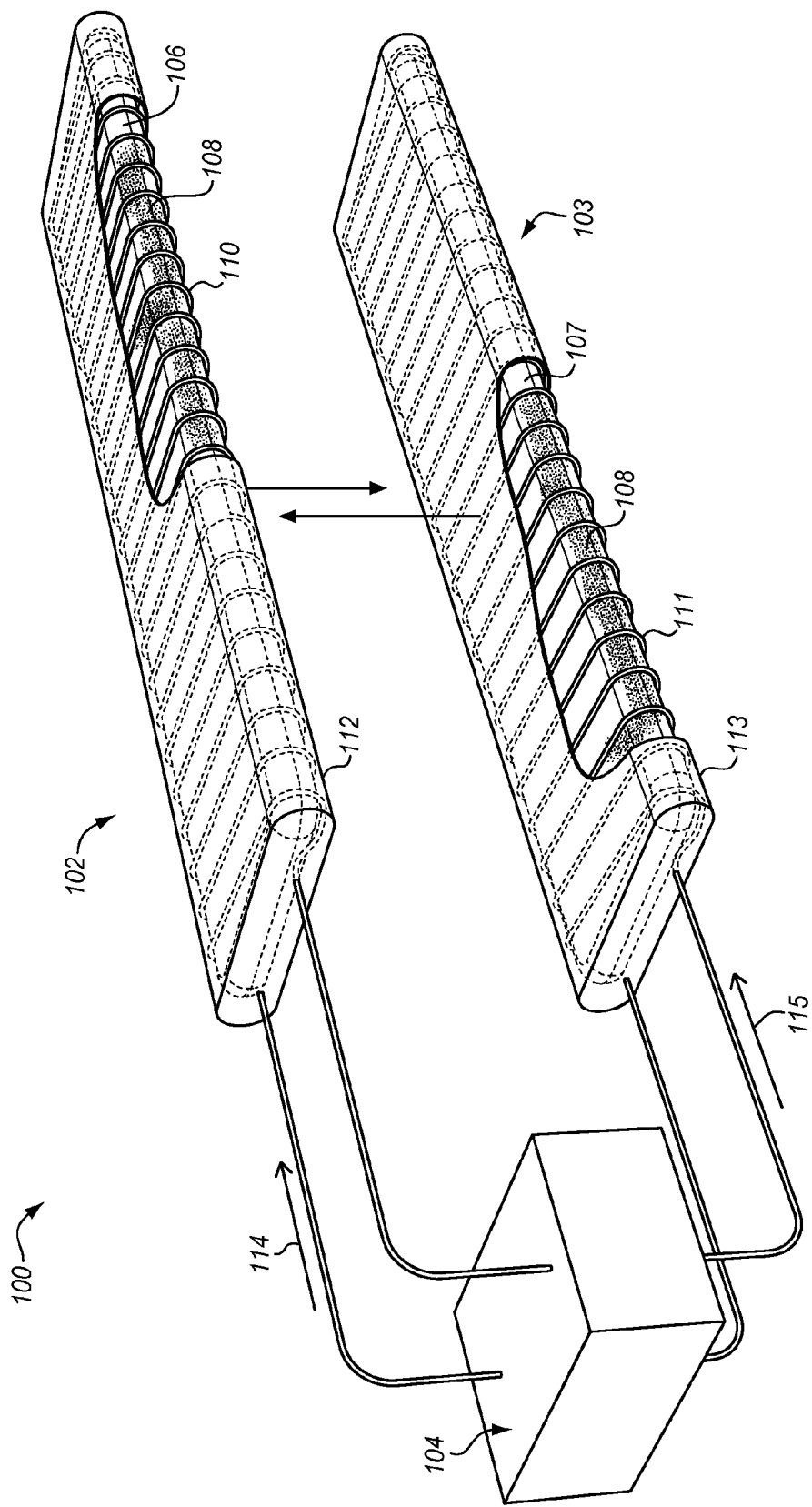
FIG. 1 illustrates an electromagnetic clamp in an exemplary embodiment.

FIG. 1 illustrates an electromagnetic clamp 100 in an exemplary embodiment. In this embodiment, electromagnetic clamp 100 includes a pair of flexible electromagnetic members 102-103 and a current source 104.

In the embodiments described herein, electromagnetic clamp 100 is utilized to clamp or otherwise secure various assemblies (not shown in this view) together during a manufacturing process. For example, electromagnetic members 102-103 may be disposed across from each other on opposing sides of an assembly in order to apply a clamping force to the assembly. Because electromagnetic members 102-103 are flexible, electromagnetic members 102-103 are able to deform in order to apply a clamping force to the assembly. For instance, if the assembly is a curved section of material, then electromagnetic members 102-103 are able to deform to fit against the curved section during operation of electromagnetic clamp 100 in order to apply a uniform or substantially uniform pressure to both sides of the assembly.

In this embodiment, electromagnetic members 102-103 each include at least one internal flexible bladder 106-107, respectively. Bladders 106-107 may comprise any material that allows bladders 106-107 to remain flexible. For instance, bladders 106-107 may be formed from a flexible rubber or a flexible plastic material. Bladders 106-107 in this embodiment each include ferromagnetic filings 108 that are disposed within an internal cavity defined by each of the respective bladders 106-107. Ferromagnetic filings 108 may comprise a powder or small granules of ferromagnetic material, such as Iron filings. Iron filings is just one example of a ferromagnetic material that may be included in bladders 106-107, and therefore ferromagnetic filings 108 are not limited to Iron filings. Rather, ferromagnetic filings 108 may include any powder or granules that are able to amplify an applied magnetic field while allowing bladders 106-107 to remain flexible.

In this embodiment, electromagnetic members 102-103 each include electrical windings 110-111 that are wrapped around bladders 106-107, respectively. Electrical winding 110 may be referred to as a first electrical winding in some embodiments, while electrical winding 111 may be referred to as a second electrical winding in some embodiments. Electrical windings 110-111 may be flexible or semi-flexible. When a current is provided to electrical windings 110-111 by current source 104, ferromagnetic filings 108 within bladders 106 amplify a magnetic field generated by electrical winding 110, and ferromagnetic filings 108 within bladder 107 amplify a magnetic field generated by electrical winding 111. This allows electromagnetic members 102-103 to operate similar to an electromagnet.

In this embodiment, electromagnetic member 102 includes a flexible sleeve 112 that is wrapped around electrical winding 110 and bladder 106, and electromagnetic member 103 includes a flexible sleeve 113 that is wrapped around electrical winding 111 and bladder 107. Sleeves 112-113 may be formed from a flexible fabric, such as flexible plastic fibers, canvas, leather, nylon, KEVLAR®, etc. These are just a few examples of the types of materials that sleeves 112-113 may be fabricated from. In broader terms, sleeves 112-113 may comprise any material that enables electromagnetic members 102-103 to flex or deform to apply a clamping force to non-planar surfaces.

In this embodiment, current source 104 includes any component, system, or device that is able to apply a variable current to electrical windings 110-111. Current source 104 is able to generate a variable magnetic field within electrical windings 110-111, which is amplified by ferromagnetic filings 108 within bladders 106-107. In FIG. 1, electrical winding 110 carries a current 114, and electrical winding 111 carries a current 115. Currents 114-115 may have the same magnitude or different magnitudes. The particular electrical configuration between current source 104 and electrical windings 110-111 is just one example, and therefore, electromagnetic clamp 100 in not limited to this particular configuration.

In order to apply a clamping force to an assembly, electromagnetic members 102-103 are configured to have opposing magnetic fields. An attractive force (indicated by arrows between electromagnetic members 102-103) is generated, allowing electromagnetic members 102-103 to apply a clamping force to objects, work pieces, assemblies, etc., that are disposed between electromagnetic members 102-103.

Configuring the opposing magnetic fields may be performed in a number of different ways. For instance, electrical windings 110-111 may be wired to current source 104 in a particular configuration to generate opposing magnetic fields, electrical windings 110-111 may be wound around their respective bladders 106-107 differently to generate the opposing magnetic fields, etc.

The attractive force that is generated between electromagnetic members 102-103 varies based on the magnitude of currents 114-115 applied to windings 110-111, respectively. For instance, increasing the magnitude of currents 114-115 generate a stronger magnetic field in electromagnetic members 102-103, which increases the attractive force between them and consequently, increases the resulting clamping force that electromagnetic members 102-103 are able to apply to an assembly (not shown in this view) that is sandwiched between them.

Figure 2:
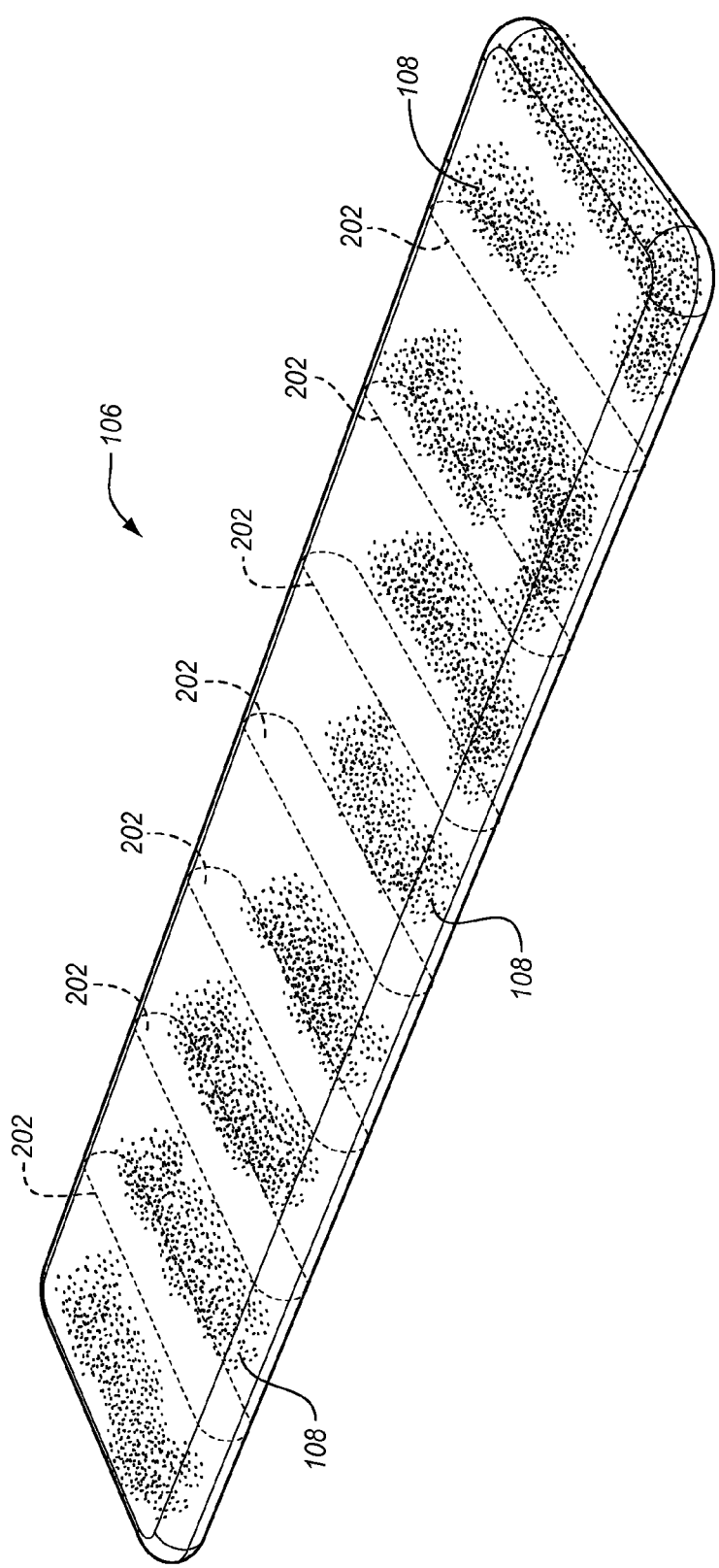
FIG. 2 illustrates the bladder of FIG. 1 in an exemplary embodiment.

FIG. 2 illustrates bladder 106 of FIG. 1 in an exemplary embodiment. Although only bladder 106 is illustrated in FIG. 2, the same or similar features shown for bladder 106 may also apply to bladder 107. In this embodiment, bladder 106 includes a plurality of internal baffles 202, which are features inside of bladder 106 that are used to prevent the movement of ferromagnetic filings 108 within bladder 106. For instance, without baffles 202, ferromagnetic filings 108 may pool or collect in different locations of bladder 106, which may be undesirable. Further, baffles 202 may allow for some portions of bladder 106 to be devoid of ferromagnetic filings 108 or have a decreased concentration or volume of ferromagnetic filings 108. This may be desirable in cases where certain portions of an assembly to be clamped may be more delicate, with it being prudent to reduce the clamping force applied to such sections. In like manner, it may be desirable to vary the concentration of ferromagnetic filings 108 within different sections of bladder 106 that are created by baffles 202. This may allow a clamping force applied by electromagnetic member 102 to vary from one portion of electromagnetic member 102 to another portion of electromagnetic member 102, depending on a concentration or volume of ferromagnetic filings 108 that are located in the different sections of bladder 106 that are created by baffles 202.

Figure 3:
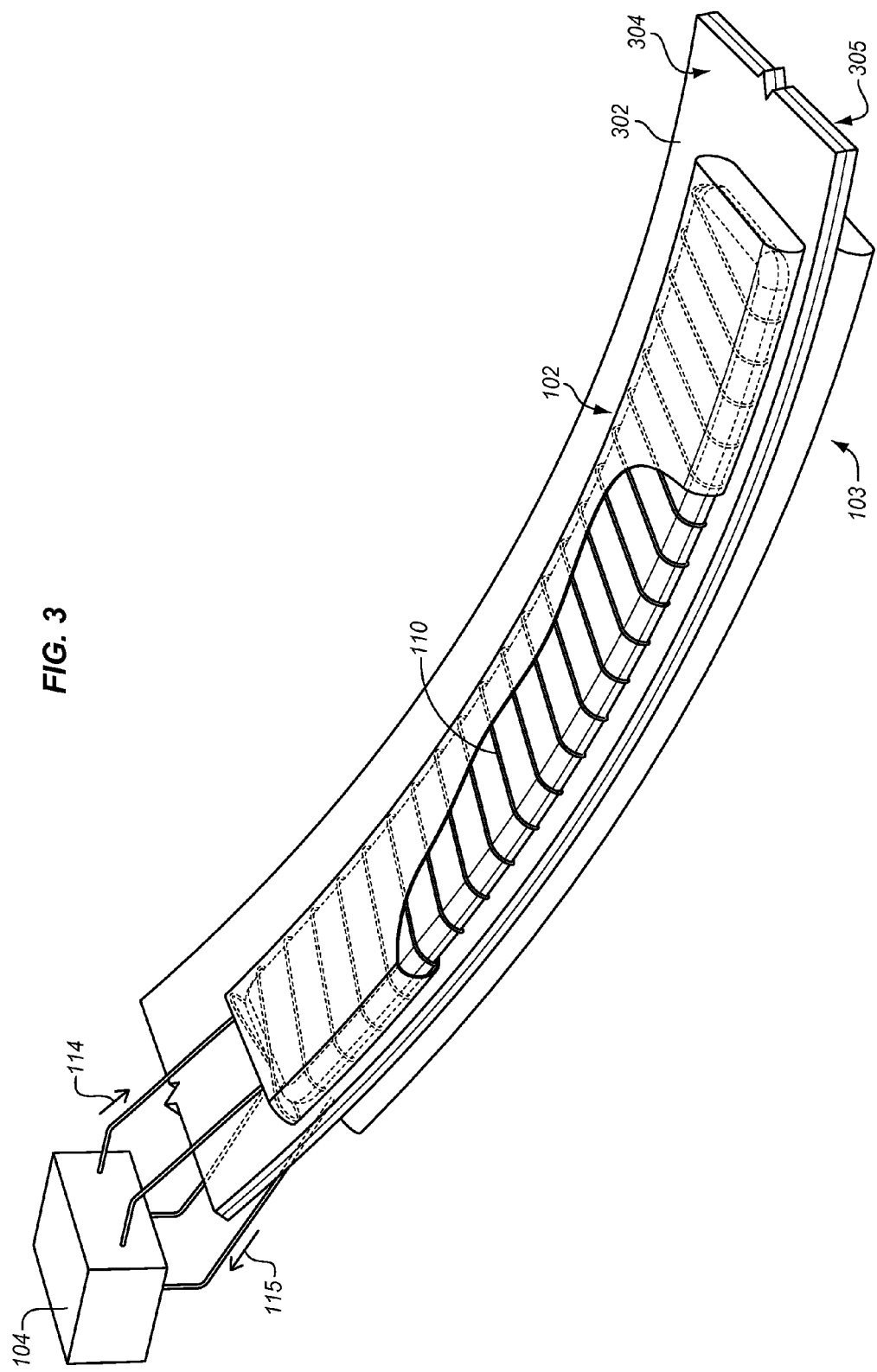
FIG. 3 illustrates an assembly being clamped by the electromagnetic clamp of FIG. 1 in an exemplary embodiment.

FIG. 3 illustrates an assembly 302 being clamped by electromagnetic clamp 100 of FIG. 1 in an exemplary embodiment. In this embodiment, electromagnetic member 102 is disposed on a first side 304 of assembly 302, while electromagnetic member 103 is disposed on a second side 305 of assembly 302. Electromagnetic members 102-103 are on opposing sides of assembly 302.

In FIG. 3, the strength of the magnetic field generated by electromagnetic member 102 is based on current 114 supplied by current source 104. In like manner, the strength of the magnetic field generated by electromagnetic member 103 is based on current 115 supplied by current source 104. The opposing magnetic fields generate an attractive force between electromagnetic members 102-103. The attractive force squeezes or clamps assembly 302 along first side 304 where electromagnetic member 102 contacts assembly 302, and also along second side 305 where electromagnetic member 103 contacts assembly 302. The clamping force is distributed along a wide area of assembly 302, and is uniform or nearly uniform because each of electromagnetic members 102-103 is capable of deforming or flexing during operation to conform to whatever non-planar features are present along either first side 304 or second side 305 of assembly 302. In FIG. 3, the non-planar features of assembly 302 is a curve, although other non-planar features may be successfully clamped by electromagnetic members 102-103 including indentations, ridges, depressions, etc., which may be present in either first side 304 or second side 305 of assembly 302.

Controlling the clamping force applied to assembly 302 is performed by varying the magnetic field strength generated in one or both of electromagnetic members 102-103. For example, current source 104 may increase current 114 to electrical winding 110 of electromagnetic member 102, which increases the attractive force between electromagnetic members 102-103 and therefore, increases the clamping force applied to assembly 302 by electromagnetic clamp 100. In addition or instead, current source 104 may increase current 115 to electrical winding 111 (see FIG. 1) of electromagnetic member 103, which increases the attractive force between electromagnetic members 102-103 and therefore, increases the clamping force applied to assembly 302 by electromagnetic clamp 100. Current source 104 may vary the clamping force applied by electromagnetic members 102-103 to assembly 302 from between about zero Pounds per Square Inch (PSI) and five hundred PSI.

The converse is also true. For example, current source 104 may decrease current 114 to electrical winding 110 of electromagnetic member 102, which decreases the attractive force between electromagnetic members 102-103 and therefore, decreases the clamping force applied to assembly 302 by electromagnetic clamp 100. In addition or instead, current source 104 may decrease current 115 to electrical winding 111 (see FIG. 1) of electromagnetic member 103, which decreases the attractive force between electromagnetic members 102-103 and therefore, decreases the clamping force applied to assembly 302 by electromagnetic clamp 100.

Utilizing electromagnetic clamp 100 of FIGS. 1-3, clamping processes can be performed on a wide variety of assemblies that may include non-planar features that would often be difficult to clamp. For instance, during assembly of an aircraft fuselage, electromagnetic clamp 100 may be utilized to apply a clamping force across a larger section of the fuselage, since electromagnetic members 102-103 are flexible and are able to conform to the non-planar surfaces of the fuselage. Further, electromagnetic members 102-103 can be fabricated to reach a large size (e.g., at least a few meters long), which increases the clamping area applied by electromagnetic members 102-103 to assembly 302.

Figure 4:
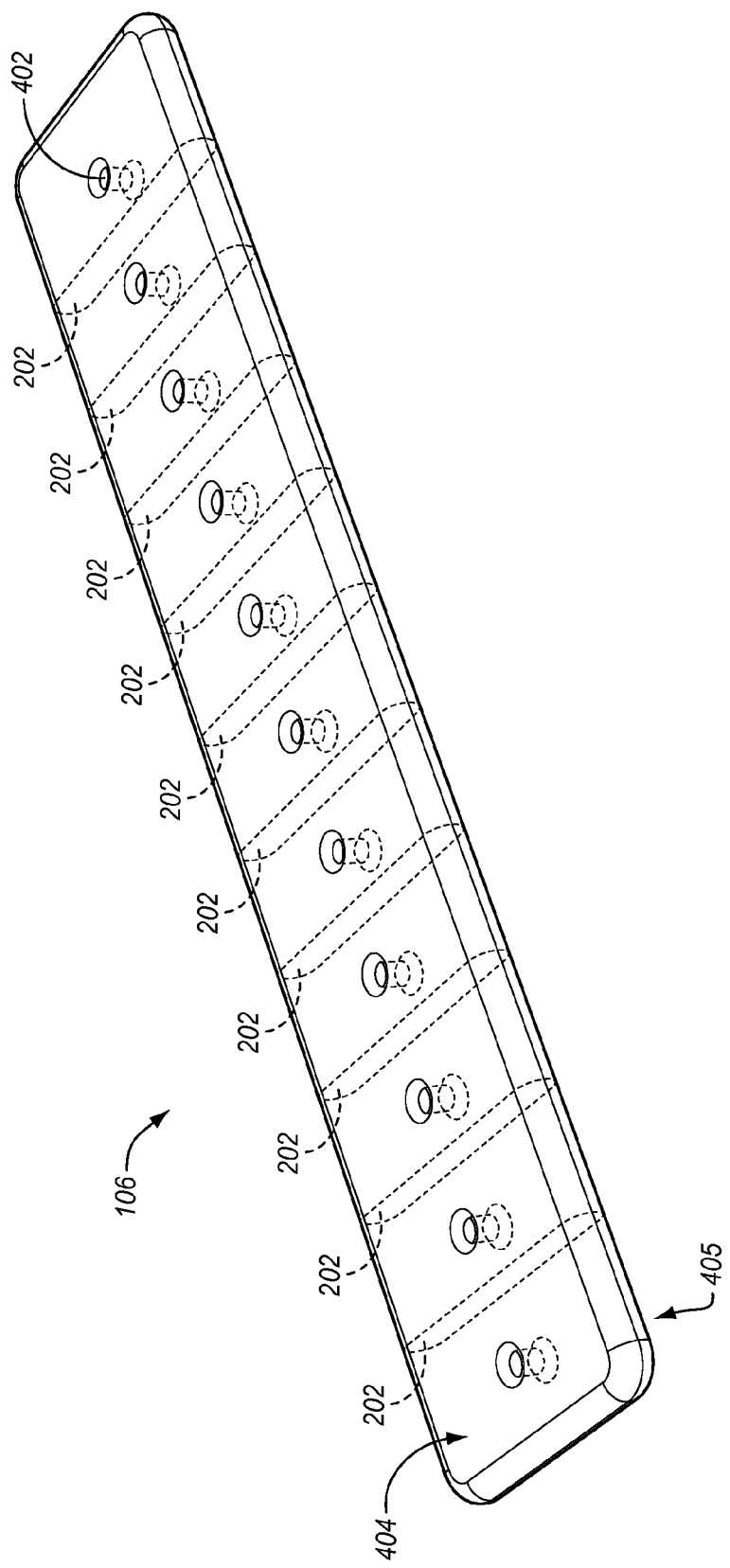
FIG. 4 illustrates the bladder of FIG. 1 including a plurality of passages in an exemplary embodiment.

FIG. 4 illustrates the bladder of FIG. 1 including a plurality of passages in an exemplary embodiment. Although only bladder 106 is illustrated in FIG. 4, the same or similar features shown for bladder 106 may also apply to bladder 107. In this embodiment, bladder 106 includes a number of passages 402 that transect bladder 106 between a top surface 404 of bladder 106 and a bottom surface 405 of bladder 106. Passages 402 are able to allow a tool (e.g., a drill bit) to traverse through bladder 106. Even though passages 402 transect bladder 106, the integrity of bladder 106 is maintained and ferromagnetic filings 108 (see FIG. 2) within bladder 106 remain in place. Passages 402 allow a tool (e.g., a drill bit) to contact assembly 302 during a clamping process.

Figure 5:
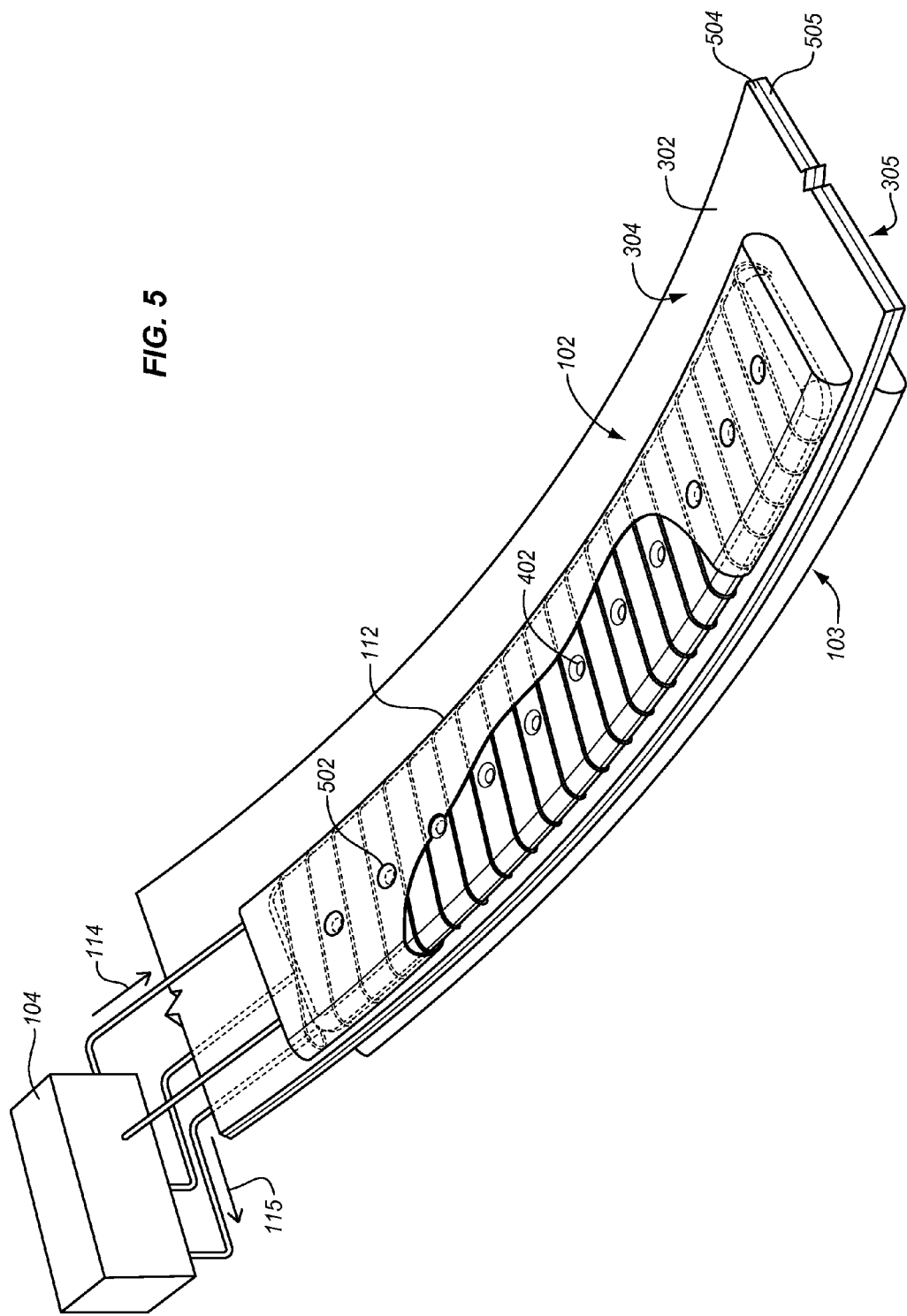
FIG. 5 illustrates an assembly being clamped by electromagnetic members that include the bladders of FIG. 4 in an exemplary embodiment.

FIG. 5 illustrates assembly 302 being clamped by electromagnetic members 102-103 that include the bladders of FIG. 4 in an exemplary embodiment. In this embodiment, sleeves 112-113 (see FIG. 1) have been modified to include openings 502 that correspond to the passages 402 in bladders 106-107. In this embodiment, openings 502 and passages 402 traverse through electromagnetic member 102 to expose a portion of first side 304 of assembly 302. A tool, such as a drill bit, may then traverse electromagnetic member 102 and contact a portion of assembly 302 along first side 304 which is exposed by openings 502 and passages 402. If the tool is a drill bit, then assembly 302 may be drilled through without damaging electromagnetic members 102-103. If assembly 302 includes multiple layers 504-505 that may separate during drilling, then current source 104 may be used to adjust currents 114-115 to modify the clamping force applied by electromagnetic members 102-103 to assembly 302. For example, if a larger drill bit is to be used to drill through assembly 302 and there is the possibility that layers 504-505 of assembly 302 may separate or be forced apart during the drilling process, then current source 104 may be used to increase currents 114-115 in order to increase the clamping force applied to assembly 302 by electromagnetic members 102-103.

Even though electromagnetic members 102-103 includes passages 402, electromagnetic members 102-103 are still capable of applying a uniform or substantially uniform force to assembly 302 because the diameter of passages 402 may be small relative to the contact area between electromagnetic members 102-103 and assembly 302.

Figure 6:
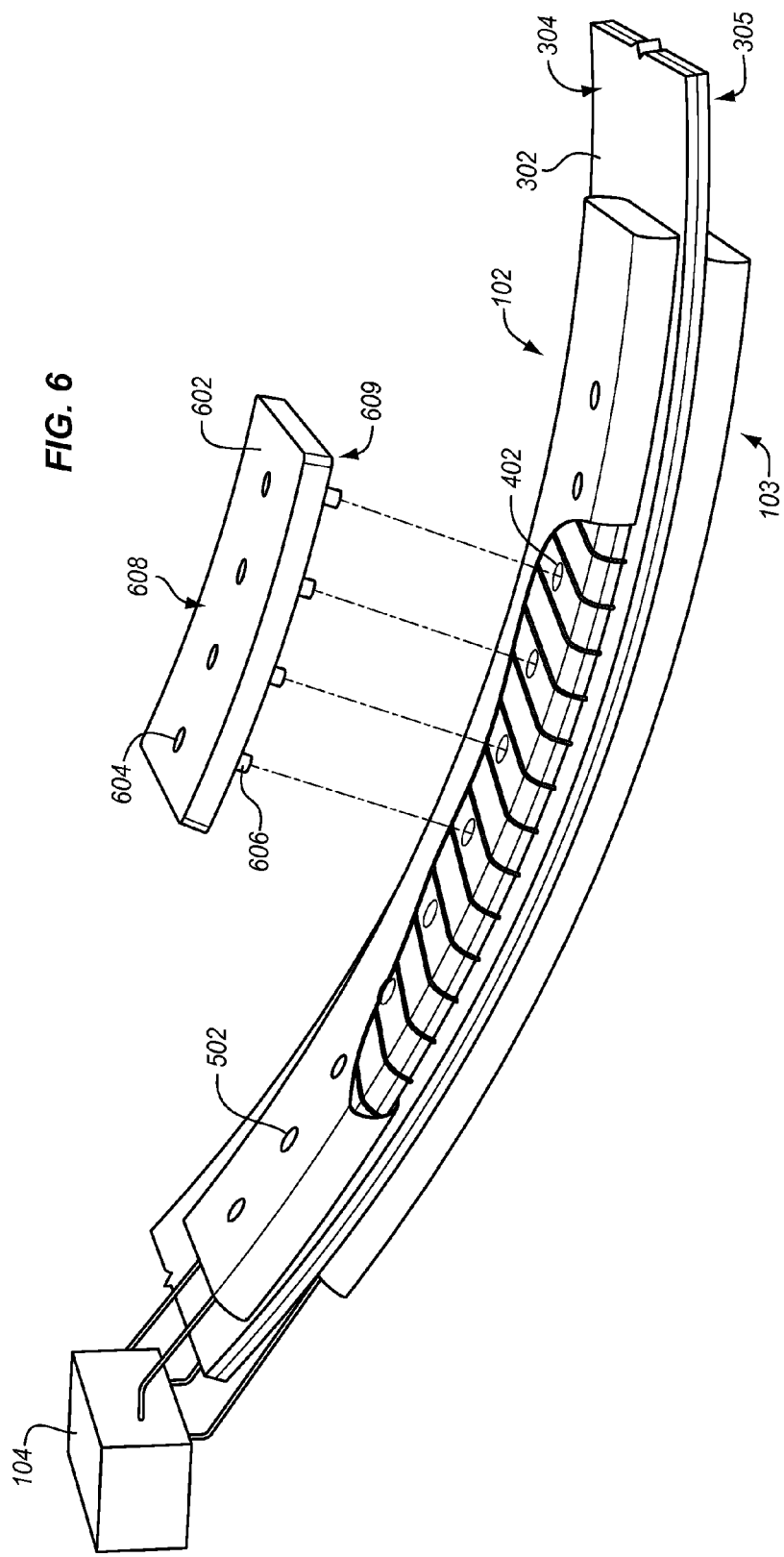
FIG. 6 illustrates the use of a drill template that may be applied to the electromagnetic members for a drilling process in an exemplary embodiment.

FIG. 6 illustrates the use of a removable drill template 602 that may be applied to electromagnetic members 102-103 for a drilling process in an exemplary embodiment. In some cases, drill template 602 may be affixed to electromagnetic members 102-103 to allow a drilling process to be performed on assembly 302 along a pre-defined pattern of holes 604 along a top side 608 of drill template 602. Drill template 602 may be used, for example, by a track drilling machine during assembly of a fuselage of an aircraft. Drill template 602 includes various features along a bottom side 609 that match the geometry of passages 402 that traverse electromagnetic members 102-103. This allows drill template 602 to mate to passages 402. Drill template 602 includes a number of projections 606 which are alignment features for drill template 602. Projections 606 are configured to align with the geometry of passages 402 in bladder 106 and openings 502 (see FIG. 5) in sleeve 112 of electromagnetic member 102. A length of projections 606 on drill template 602 may correspond to a distance through passages 402 from one side to another of electromagnetic member 102. In this case, projections 606 may contact assembly 302 and ensure that drill template 602 is flush with the surface (e.g., first side 304) of assembly 302 during the drilling process. Although drill template 602 has been illustrated to have features that correspond with top surface 304 of assembly 302 and electromagnetic member 102, drill template 602 may instead have features that correspond with bottom surface 305 of assembly 302 and electromagnetic member 103. This allows drill templates to be used to drill from either top surface 304 of assembly 302 or from bottom surface 305 of assembly 302.

Figure 7:
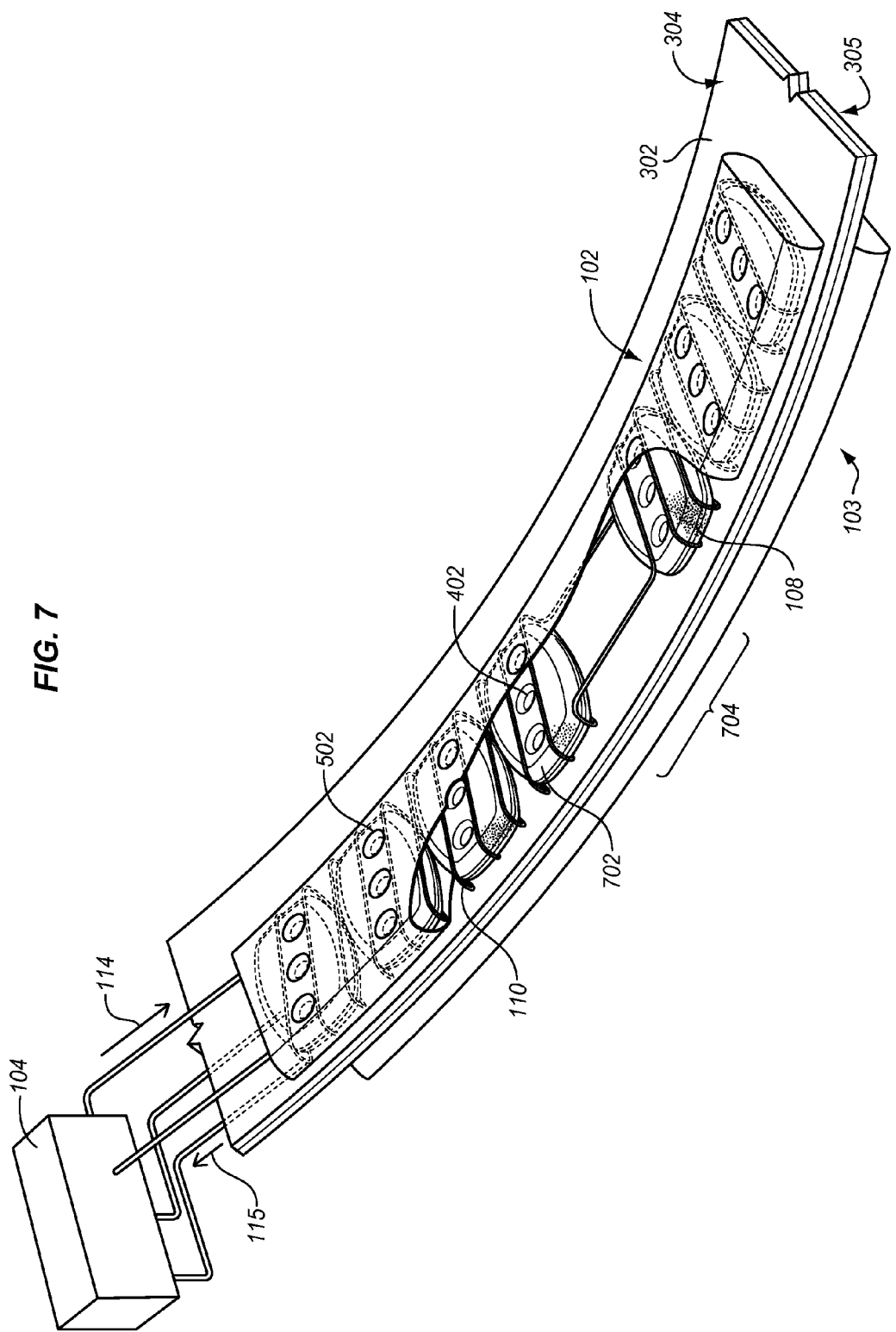
FIG. 7 illustrates an assembly being clamped by the electromagnetic members that include a plurality of bladders in an exemplary embodiment.

FIG. 7 illustrates assembly 302 being clamped by electromagnetic members 102-103 that include a plurality of bladders 702 in an exemplary embodiment. In this embodiment, bladders 702 include electromagnetic filings 108. Electrical winding 110 wraps around bladders 702, and sleeve 112 wraps around winding 110 and bladders 702. Securing bladders 702 in place within sleeve 112 may be accomplished in a number of different ways. For instance, sleeve 112 may be sewn to bladders 702, sleeve 112 may be sewn together around bladders 702, etc. Although only electromagnetic member 102 is illustrated with bladders 702, the same or similar features shown for electromagnetic member 102 may also apply to electromagnetic member 103.

In this embodiment, electromagnetic member 102 includes a spacing 704 that is devoid of bladders 702. In the area around spacing 702, sleeve 112 may be sewn together to hold bladders 702 in place around spacing 704. By not including one of bladders 702 within electromagnetic member 102, a clamping force applied by electromagnetic member 102 to assembly 302 near top surface 304 of assembly 302 that is proximate to spacing 702 is reduced. This may be desirable when portions of assembly 302 are delicate and may be damaged if subjected to the full clamping force applied by electromagnetic members 102-103.

Although specific embodiments were described herein, the scope is not limited to those specific embodiments. Rather, the scope is defined by the following claims and any equivalents thereof.

The invention claimed is:

1. An electromagnetic clamp, comprising:
a pair of flexible electromagnetic members that are configured to be disposed on opposing sides of an assembly to be clamped, each flexible electromagnetic member including:
a flexible bladder that includes ferromagnetic filings;
an electrical winding wrapped around the flexible bladder that is configured to generate a magnetic field across the flexible bladder based on an applied current; and
a flexible sleeve wrapped around the flexible bladder and the electrical winding; and
a current source electrically coupled to each electrical winding that is configured to control a clamping force applied by the flexible electromagnetic members to the assembly based on the applied current.

2. The electromagnetic clamp of claim 1 wherein:
at least one flexible bladder has a top surface and a bottom surface, and includes a plurality of passages that transect the at least one flexible bladder between the top surface and the bottom surface; and
at least one flexible sleeve has a plurality of openings that correspond with the passages of the at least one flexible bladder.

3. The electromagnetic clamp of claim 2 further comprising:
a removable drill template that is configured to mount through the openings of the at least one flexible sleeve and through the passages of the at least one flexible bladder to enable a drill bit to contact the assembly in a pre-defined pattern.

4. The electromagnetic clamp of claim 2 wherein:
the passages that transect the at least one flexible bladder are sized to enable a drill bit to traverse the passages and contact the assembly.

5. The electromagnetic clamp of claim 1 wherein:
the ferromagnetic fillings comprise Iron filings.

6. The electromagnetic clamp of claim 1 wherein:
each of the opposing sides of the assembly forms a non-planar surface; and
each flexible electromagnetic member is configured to conform to the non-planar surface of an opposing side of the assembly responsive to the applied current.

7. The electromagnetic clamp of claim 1 wherein:
the current source is configured to vary the clamping force applied by the flexible electromagnetic members to the assembly from between zero Pounds per Square Inch (PSI) and five hundred PSI.

8. The electromagnetic clamp of claim 1 wherein:
the flexible electromagnetic members are configured to apply the clamping force to the assembly utilizing an opposing magnetic field generated by each flexible electromagnetic member.

9. The electromagnetic clamp of claim 1 wherein:
at least one flexible sleeve comprises a flexible KEVLAR® sleeve.

10. The electromagnetic clamp of claim 1 wherein:
at least one flexible bladder includes a plurality of baffles that hold the ferromagnetic filings in place.

11. A clamping system, comprising:
a first flexible electromagnetic member configured to be disposed on a first side of an object to be clamped;
a second flexible electromagnetic member configured to be disposed on a second side of the object to be clamped, wherein the first and second flexible electromagnetic members are configured to conform to non-planar surfaces of the object to be clamped; and
a current source electrically coupled to the first and second flexible electromagnetic members that is configured to control a clamping force exerted by the first and second flexible electromagnetic members on the object.

12. The clamping system of claim 11 wherein:
the current source is configured to increase a current to at least one of the first and second flexible electromagnetic members to increase a clamping force applied to the object by the first and second flexible electromagnetic members.

13. The clamping system of claim 11 wherein:
the first and second flexible electromagnetic members each comprise:
   a flexible bladder that includes ferromagnetic filings;
   an electrical winding wrapped around the flexible bladder that is configured to generate a magnetic field across the flexible bladder based on current applied by the current source; and
   a flexible sleeve wrapped around the flexible bladder and the electrical winding.

14. The clamping system of claim 13 wherein:
the ferromagnetic filings comprise Iron filings.

15. The clamping system of claim 13 wherein:
at least one flexible sleeve comprises a flexible KEVLAR® sleeve.

16. The clamping system of claim 11 wherein:
at least one of the first and second flexible electromagnetic members includes a pre-defined pattern of passages that are sized to enable a drill bit to traverse through the passages.

17. The clamping system of claim 11 wherein:
the current source is configured to vary the clamping force applied by the first and second flexible electromagnetic members to the object from between zero Pounds per Square Inch (PSI) and five hundred PSI.

18. An apparatus, comprising:
an electromagnetic clamp, including:
   a first flexible member configured to be disposed on a first side of an assembly to be clamped, the first flexible member including:
      a first internal bladder that includes ferromagnetic filings; and
      a first electrical winding that is configured to generate a first magnetic field across the first flexible member based on a first applied current; and
   a second flexible member configured to be disposed on a second side of the assembly to be clamped, the second flexible member including:
      a second internal bladder that includes ferromagnetic filings; and
      a second electrical winding that is configured to generate a second magnetic field across the second flexible member based on a second applied current, wherein the first magnetic field and the second magnetic field have magnetic poles that are configured in opposition; and
   at least one current source electrically coupled to the first electrical winding and the second electrical winding that is configured to vary at least one of the first applied current and the second applied current to modify a strength of at least one of the first magnetic field and the second magnetic field to control a clamping force applied by the first flexible member and the second flexible member to the assembly.

19. The apparatus of claim 18 wherein:
the first flexible member is configured to conform to non-planar features of the first side of the assembly responsive to the first applied current.

* * * * *